(12) United States Patent
Su et al.

(10) Patent No.: US 8,802,846 B1
(45) Date of Patent: Aug. 12, 2014

(54) PREPARATION AND APPLICATION OF PROPARGYL ETHER-CONTAINING BENZOXAZINE WITH HIGH-TG CHARACTERISTIC

(71) Applicant: Chung Shan Institute of Science and Technology, Armaments Bureau, M.N.D, Taoyuan County (TW)

(72) Inventors: Wen-Chiung Su, Taoyuan County (TW); Ching-Hsuann Lin, Taoyuan County (TW); Chu-Ming Huang, Taoyuan County (TW)

(73) Assignee: Chung Shan Institute of Science and Technology, Armaments Bureau, M.N.D, Taoyuan County (TW)

( * ) Notice: Subject to any disclaimer, the term of this patent is extended or adjusted under 35 U.S.C. 154(b) by 0 days.

(21) Appl. No.: 13/868,087

(22) Filed: Apr. 22, 2013

(51) Int. Cl.
*C08G 79/04* (2006.01)

(52) U.S. Cl.
USPC .................................. 544/73; 528/44; 540/9

(58) Field of Classification Search
USPC .......................................................... 544/73
See application file for complete search history.

(56) References Cited

U.S. PATENT DOCUMENTS 8,114,988 B2 * 2/2012 Su et al. ........................ 544/73

* cited by examiner

*Primary Examiner* — Kahsay Habte
(74) *Attorney, Agent, or Firm* — Chun-Ming Shih

(57) ABSTRACT

The present invention provides benzoxazine containing propargyl group as formula (I):

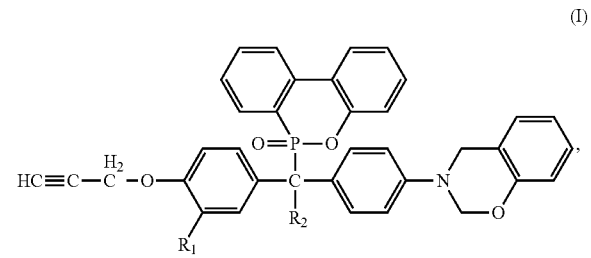

wherein $R_1$: —H, —O—$CH_2$—C≡CH, and

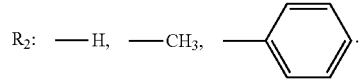

The present invention provides a method of preparing a compound of formula (I). The present invention also provides a flame resistant resin.

2 Claims, 9 Drawing Sheets

PREPARATION AND APPLICATION OF PROPARGYL ETHER-CONTAINING BENZOXAZINE WITH HIGH-TG CHARACTERISTIC

BACKGROUND OF THE INVENTION

1. Field of the Invention

The present invention relates to a series of benzoxazine containing propargyl group and a method for preparing the same. The compound may be used as flame resistant material because of containing phosphorus, and may also provide enhanced thermal stability because of introducing propargyl group to increase cross-linked point.

2. Description of Related Art

Phenol formaldehyde resin is made from condensing phenol compounds and aldehyde compounds, wherein the phenol formaldehyde resin made from condensing phenol and formaldehyde is the most important resin. The raw materials of phenol formaldehyde resin are easy to be obtained, low water absorption, excellent workability and have the superior properties which may satisfy the functions after resin cured, so that the phenol formaldehyde resin is widely used in the related field of livelihood, electronics, military, and architecture, etc. Benzoxazine resin which is developed recent years also belongs to one of the phenol formaldehyde resins, and is characterized by open ring curing after heating monomer without leaking water or other side effects while curing. Hence, benzoxazine resin has better workability than phenol formaldehyde resin.

Introducing different functional groups into benzoxazine monomer may render improved properties corresponding to that of the original one. Introducing propargyl functional group is an effective method to provide more cross-linked points, to increase glass transition temperature, and also to improve the thermal stability. However, introducing propargyl functional groups requires much complicated steps. In the prior reference, Takeichi[1] et al use three steps of (1) nucleophilic substitution reaction, (2) reducing $NO_2$ reaction, and (3) generating benzoxazine to introduce propargyl group into benzoxazine monomer. Yagci, Y[2] et al also develop another method in the same year, however the method requires four steps of (1) using acetic acid to protect $NH_2$ group, (2) nucleophilic substitution reaction, (3) forming $NH_2$ group, and (4) generating benzoxazine to synthesize benzoxazine containing proparyl group. Besides the aforementioned two, Ishida [3][4] et al use a similar method to prepare it as well.

To sum up the above references, most of the references indicate that while adding propargyl bromide, limiting propargyl bromide to react with OH group only by $NH_2$ substitution in order to protect $NH_2$. Then, using reduction to generate $NH_2$ group, and $NH_2$ group reacts with formaldehyde and phenol to form benzoxazine. However, the procedures are too complicated, our team develops a simple pattern to synthesize benzoxazone containing propargyl functional group. First, protect $NH_2$ group by forming the structure of benzoxazine, and then adding propargyl bromide to react with OH group to generate benzoxazine containing propargyl functional group. We do not need complicated steps to synthesize it through such pattern.

REFERENCES

Summary of the Invention

The purpose of the present invention is to provide novel benzoxazine compound containing propargyl functional group, wherein the structure of benzoxazine compound containing phosphorus can be used as flame resistant materials, and benzoxazine containing propargyl functional group may further provide more cross-linked point and better thermal stability at elevated temperature.

Compound

The present invention discloses a compound containing propargyl having the following chemical formula:

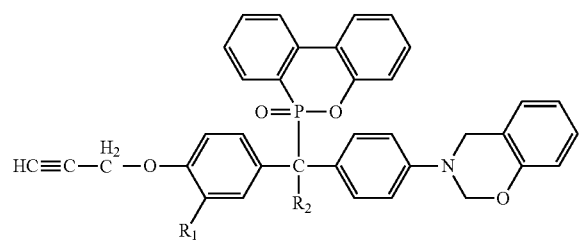

wherein $R_1$: —H, —O—$CH_2$—C≡CH, and $R_2$: —H, —$CH_3$, —C$_6$H$_5$.

when $R_1$ and $R_2$ both are hydrogen atoms in the compound of formula (I), the structural formula of the compound of formula (I) may be:

(A)

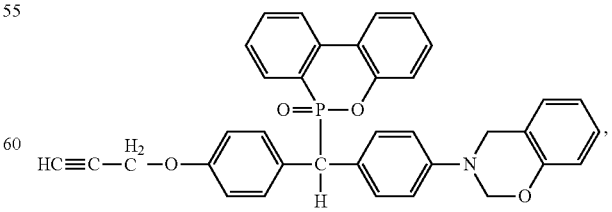

when $R_1$ is hydrogen atom and $R_2$ is —$CH_3$ in the compound of the aforementioned formula (I), the structural formula of the compound of formula (I) may be:

(B)

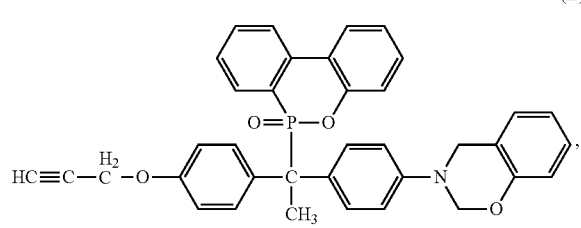

when R$_1$ is hydrogen atom and R$_2$ is

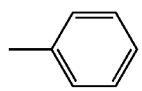

in the compound of the aforementioned formula (I), the structural formula of the compound of formula (I) may be:

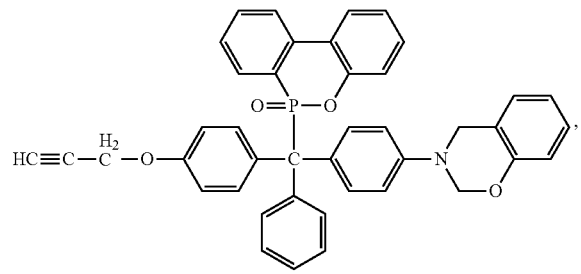 [SMILES: C#CCOc1ccc(C(c2ccccc2)(c2ccc(N3COc4ccccc4C3)cc2)P2(=O)Oc3ccccc3-c3ccccc32)cc1]

(C),
when R$_1$ is

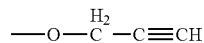

and R$_2$ is hydrogen atom in the compound of the aforementioned formula (I), the structural formula of the compound of formula (I) may be:

(D)

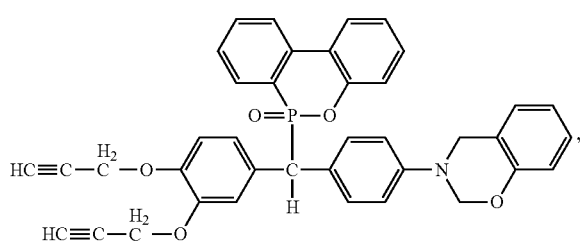

when R$_1$ is

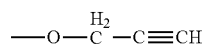

and R$_2$ is —CH$_3$ in the compound of the aforementioned formula (I), the structural formula of the compound of formula (I) may be:

(E)

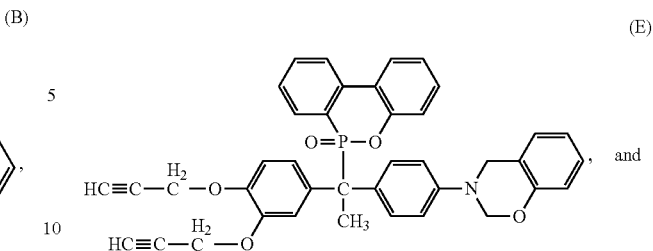

, and when R$_1$ is

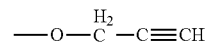

and R$_2$ is

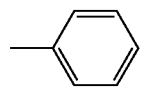

in the compound of the aforementioned formula (I), the structural formula of the compound of formula (I) may be:

(F)

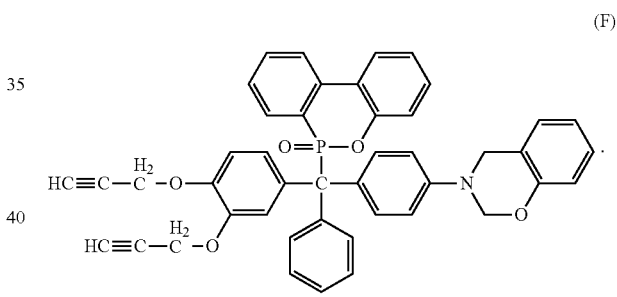

Preparing Method (1) Preparing (A), (B) and (C) Containing Mono-Propargyl Functional Group First, using DOPO to react with hydroxyacetophenone, aniline under acidic environment to synthesize a monomer (1-3) having a structure with OH group at one end and NH$_2$ group at the other end. Then, after using the monomer (1-3) to react with hydroxybenzaldehyde to form intermediate (1a-3a), adding NaBH$_4$ to process reduction to obtain monomer (7-9), and using monomer (7-9) as initiator to react with paraformaldehyde to form benzoxazine monomer (13-15). Using monomer (13-15) to react with propargyl bromide under the environment of alkali catalyst K$_2$CO$_3$ to obtain monomers (A), (B) and (C). Finally, benzoxazine monomer containing propargyl functional group is stage-heated, and propargyl would form benzopyran structure with oxygen during heat process. Continuously heating, the double bond of benzopyran would open and process cross-linking, and the benzoxazine group would self open-ring to polymerize, so that to enhance the density of cross-linked. The equation is shown as following:

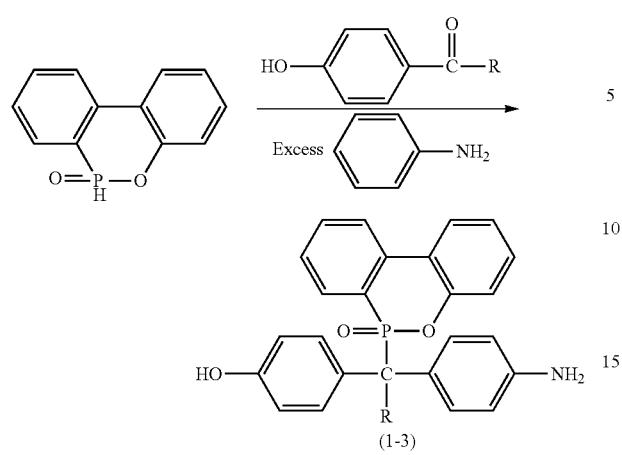

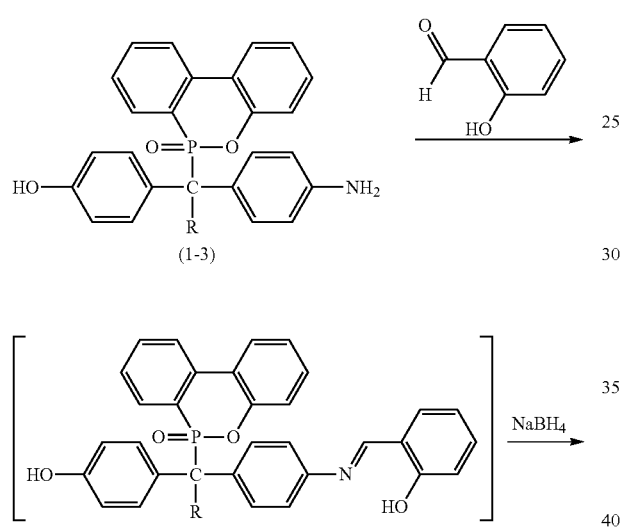

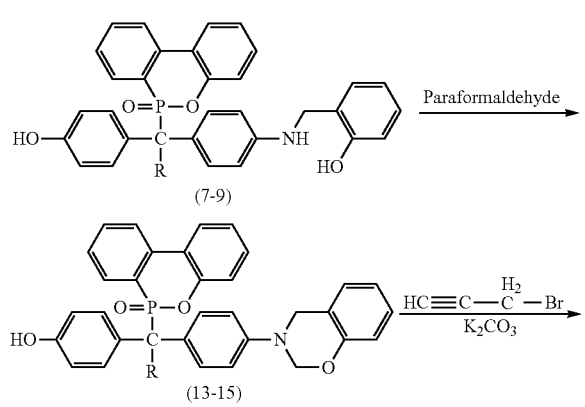

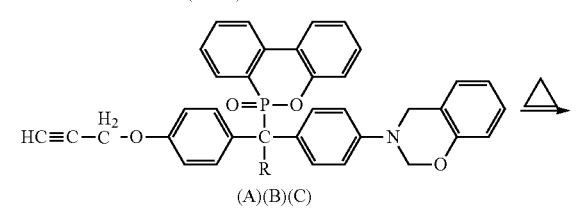

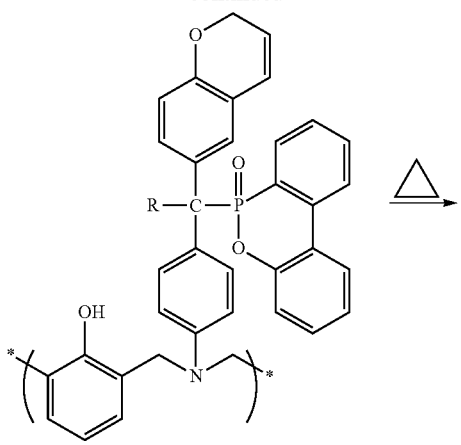

$$R = \begin{cases} H & \text{for } (1)(7)(13)(A) \\ A & \text{for } (2)(8)(14)(B) \\ \text{Phenyl} & \text{for } (2)(8)(14)(B) \end{cases}$$

(2) Preparing (D), (E) and (F) Containing Di-Propargyl Functional Groups

Using DOPO to react with 4-aminoacetophenone and catehol under acidic environment to synthesize a monomer (4-6) having a structure with two OH groups at one end and NH₂ group at the other end. The follow-up reaction mechanism is the same as the aforementioned, and the reaction mechanism is shown as following:

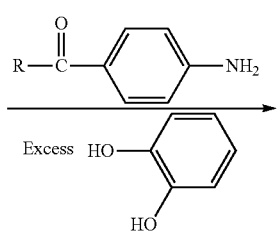

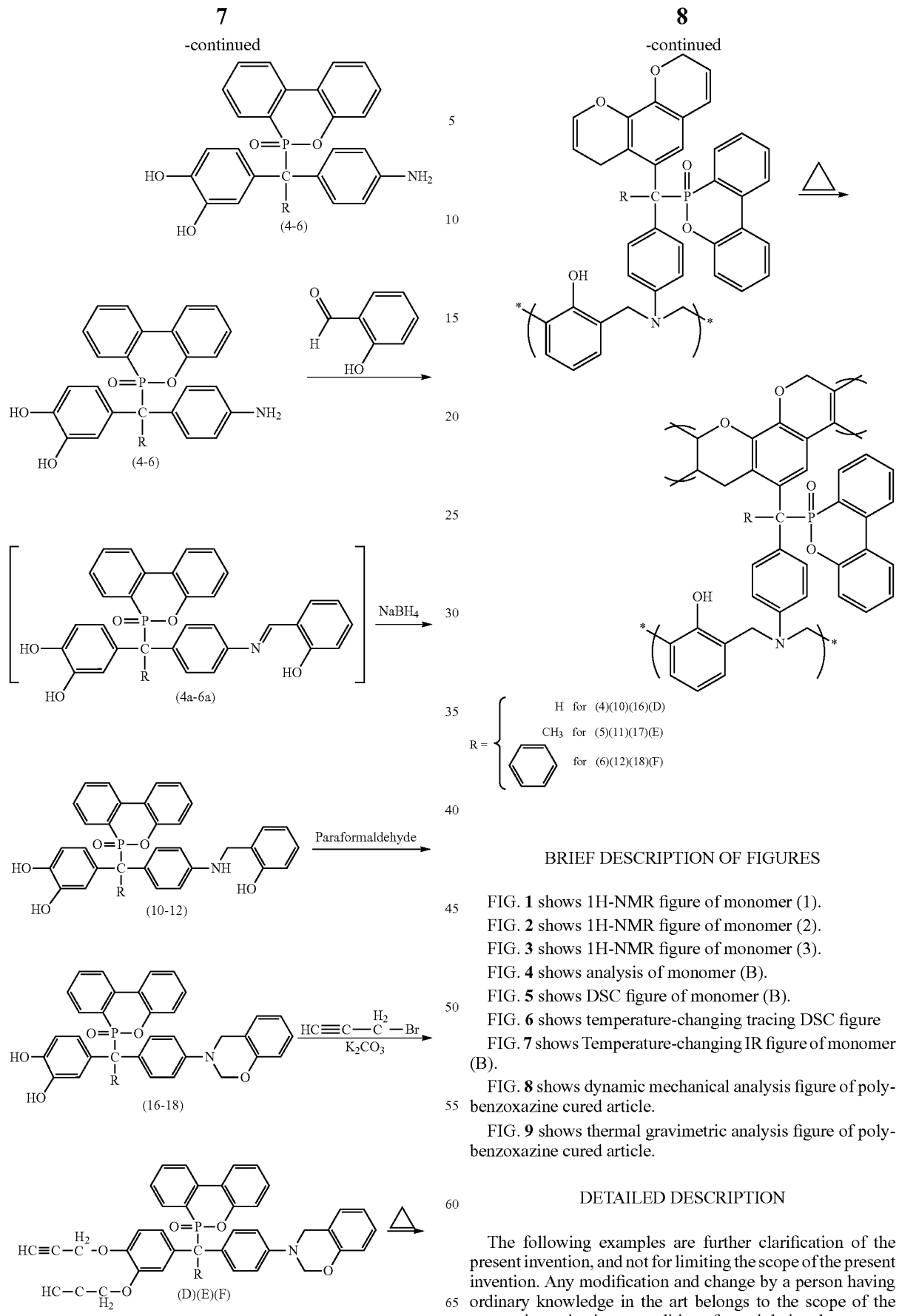

DETAILED DESCRIPTION

The following examples are further clarification of the present invention, and not for limiting the scope of the present invention. Any modification and change by a person having ordinary knowledge in the art belongs to the scope of the present invention in precondition of not violating the purpose of the present invention.

Example

The application of the above related invention would be represented by the following procedures and clarified by the following embodiment.

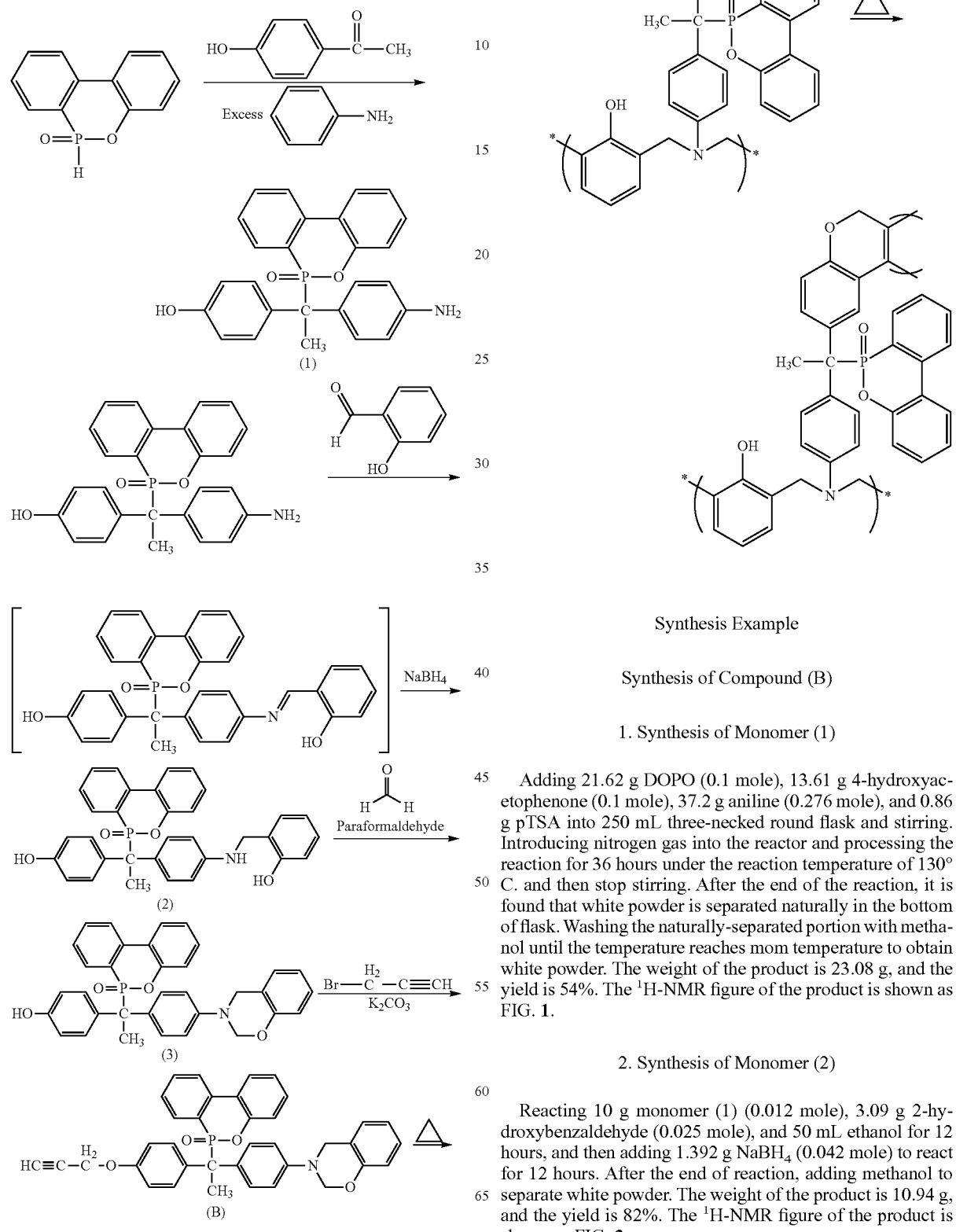

Synthesis Example

Synthesis of Compound (B)

1. Synthesis of Monomer (1)

Figure 1:
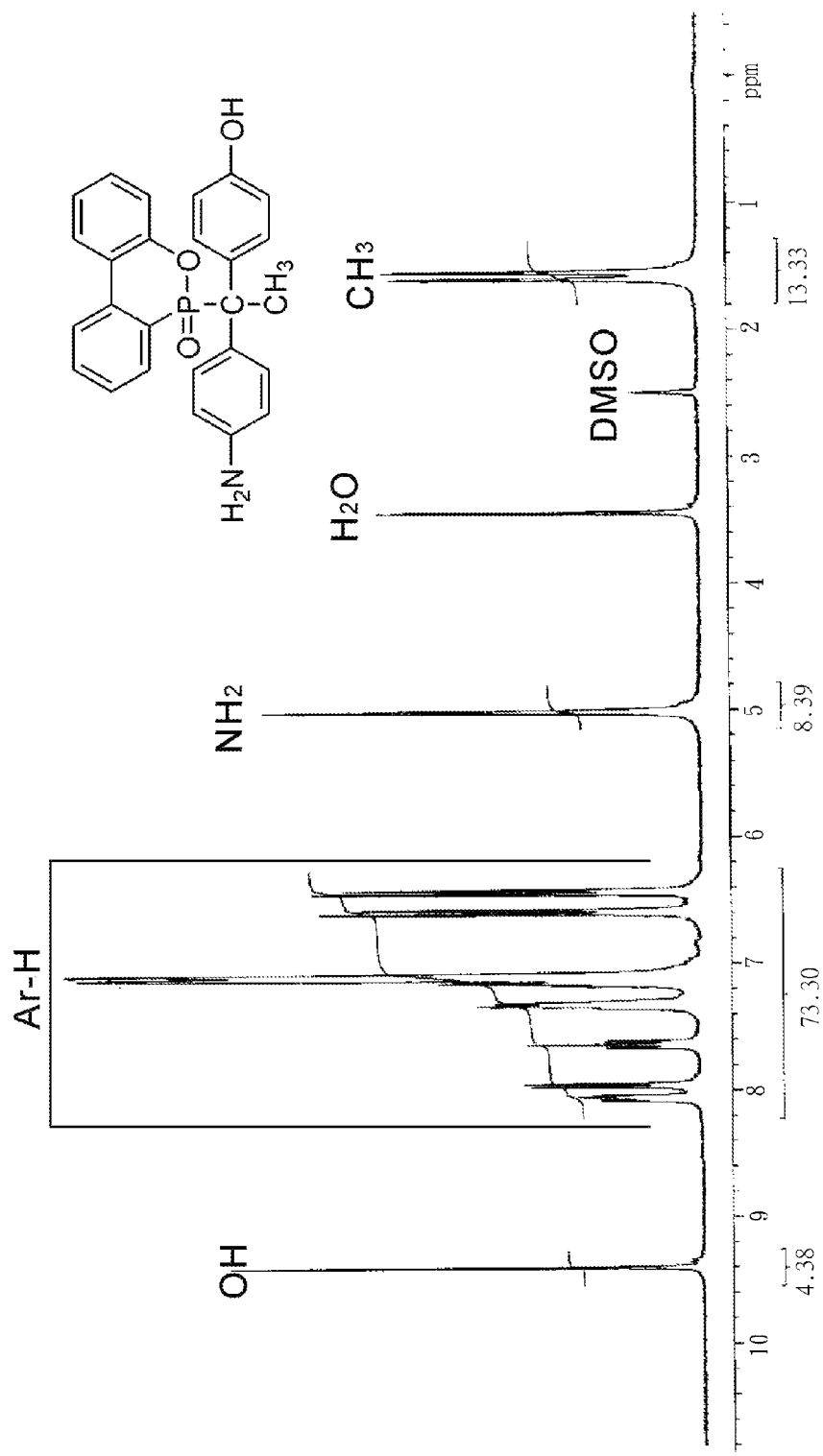
FIG. 1 shows 1H-NMR figure of monomer (1).

Adding 21.62 g DOPO (0.1 mole), 13.61 g 4-hydroxyacetophenone (0.1 mole), 37.2 g aniline (0.276 mole), and 0.86 g pTSA into 250 mL three-necked round flask and stirring. Introducing nitrogen gas into the reactor and processing the reaction for 36 hours under the reaction temperature of 130° C. and then stop stirring. After the end of the reaction, it is found that white powder is separated naturally in the bottom of flask. Washing the naturally-separated portion with methanol until the temperature reaches mom temperature to obtain white powder. The weight of the product is 23.08 g, and the yield is 54%. The $^1$H-NMR figure of the product is shown as FIG. 1.

2. Synthesis of Monomer (2)

Figure 2:
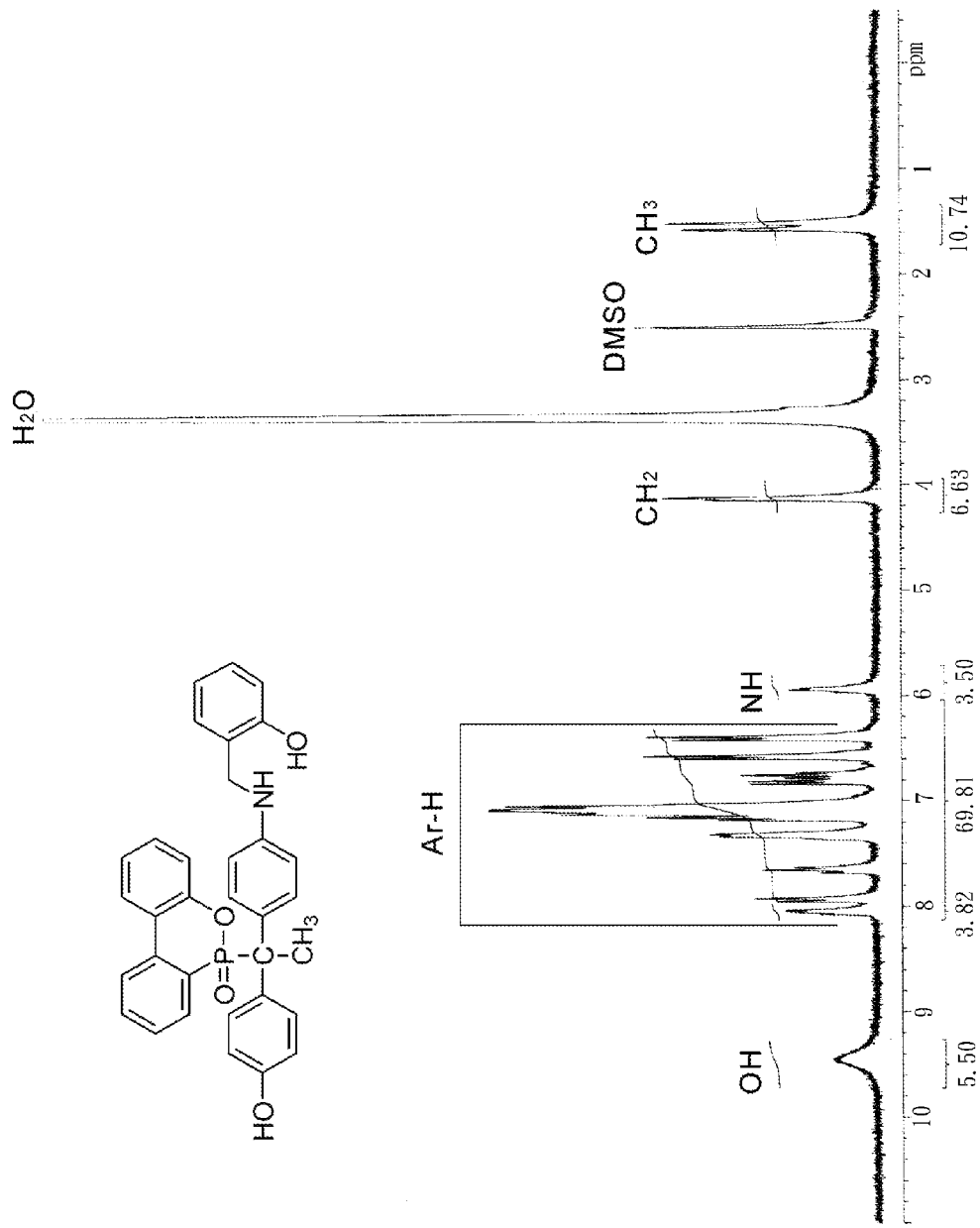
FIG. 2 shows 1H-NMR figure of monomer (2).

Reacting 10 g monomer (1) (0.012 mole), 3.09 g 2-hydroxybenzaldehyde (0.025 mole), and 50 mL ethanol for 12 hours, and then adding 1.392 g NaBH$_4$ (0.042 mole) to react for 12 hours. After the end of reaction, adding methanol to separate white powder. The weight of the product is 10.94 g, and the yield is 82%. The $^1$H-NMR figure of the product is shown as FIG. 2.

3. Synthesis of Monomer (3)

Figure 3:
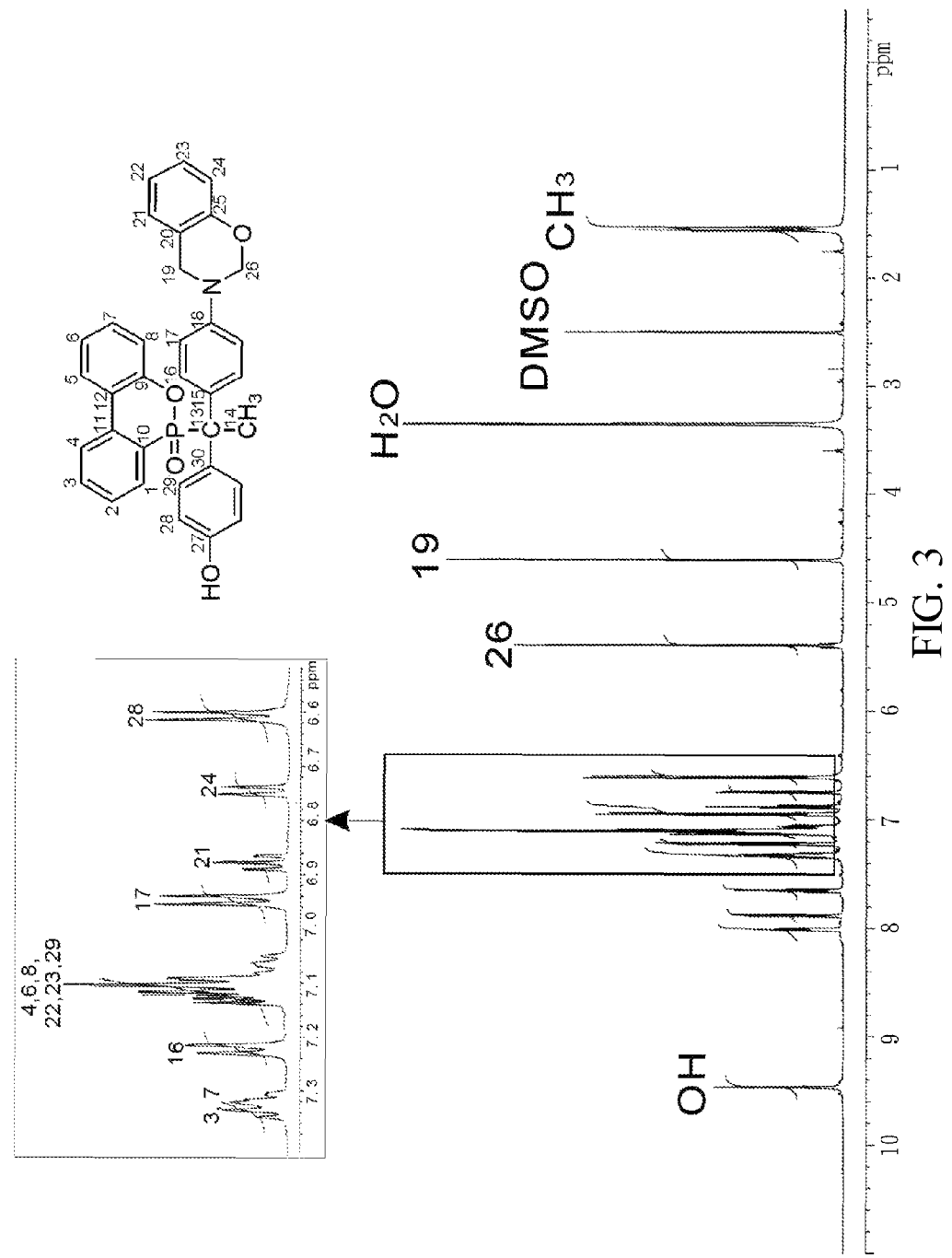
FIG. 3 shows 1H-NMR figure of monomer (3).

Reacting 7.73 g monomer (2) (0.014 mole), 0.696 g Paraformaldehyde (0.023 mole), and 50 mL tetrahydrofuran for 24 hours. After the end of reaction, white powder is separated naturally. Washing the naturally-separated portion with deionized water to obtain the product of 3.97 g, and the yield is 52%. The 1H-NMR figure of the product is shown as FIG. 3.

4. Synthesis of Monomer (B)

Figure 4:
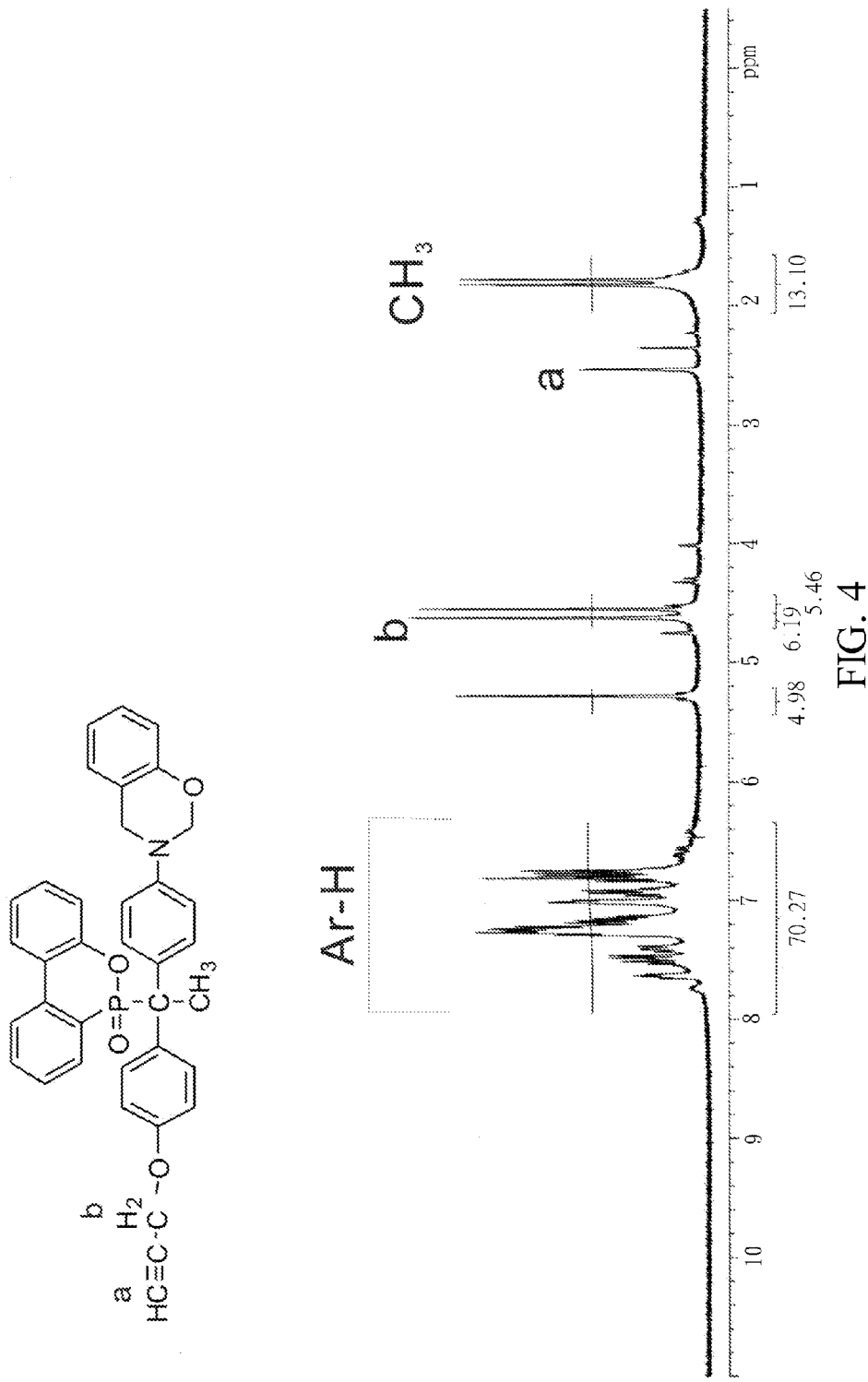
FIG. 4 shows analysis of monomer (B).

Reacting 2.73 g monomer (3) (0.005 mole), 0.892 g propargyl bromide (0.006 mole), 0.829 g $K_2CO_3$ (0.006 mole), and 30 mL acetone for 24 hours. After the end of reaction, salt is precipitated. After suction filtration, drop the filtrate into water to separate white powder. The weight of the product of 1.75 g, and the yield is 60%. The 1H-NMR figure of the product is shown as FIG. 4.

Heat-Curing Procedure

Figure 5:
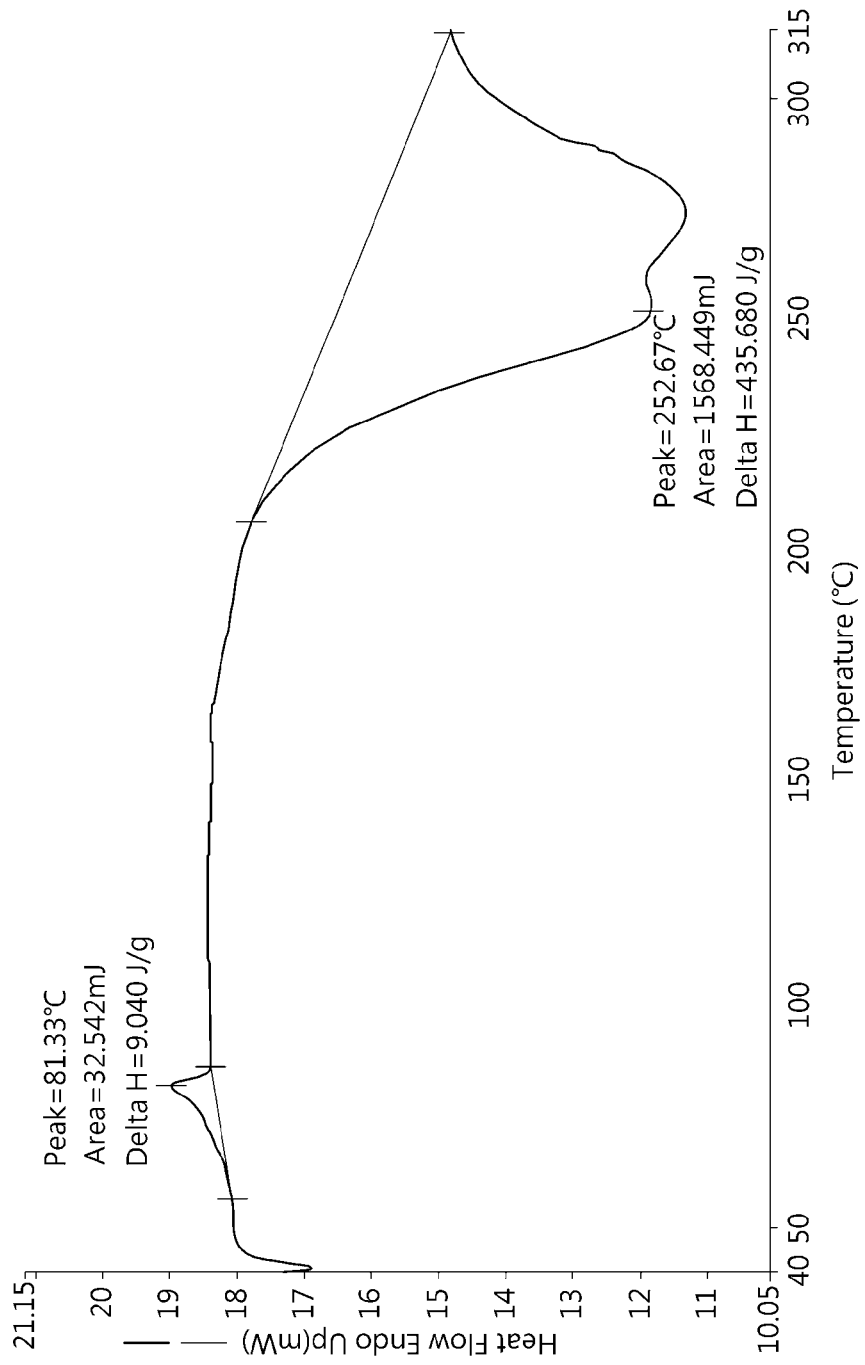
FIG. 5 shows DSC figure of monomer (B).
Figure 6:
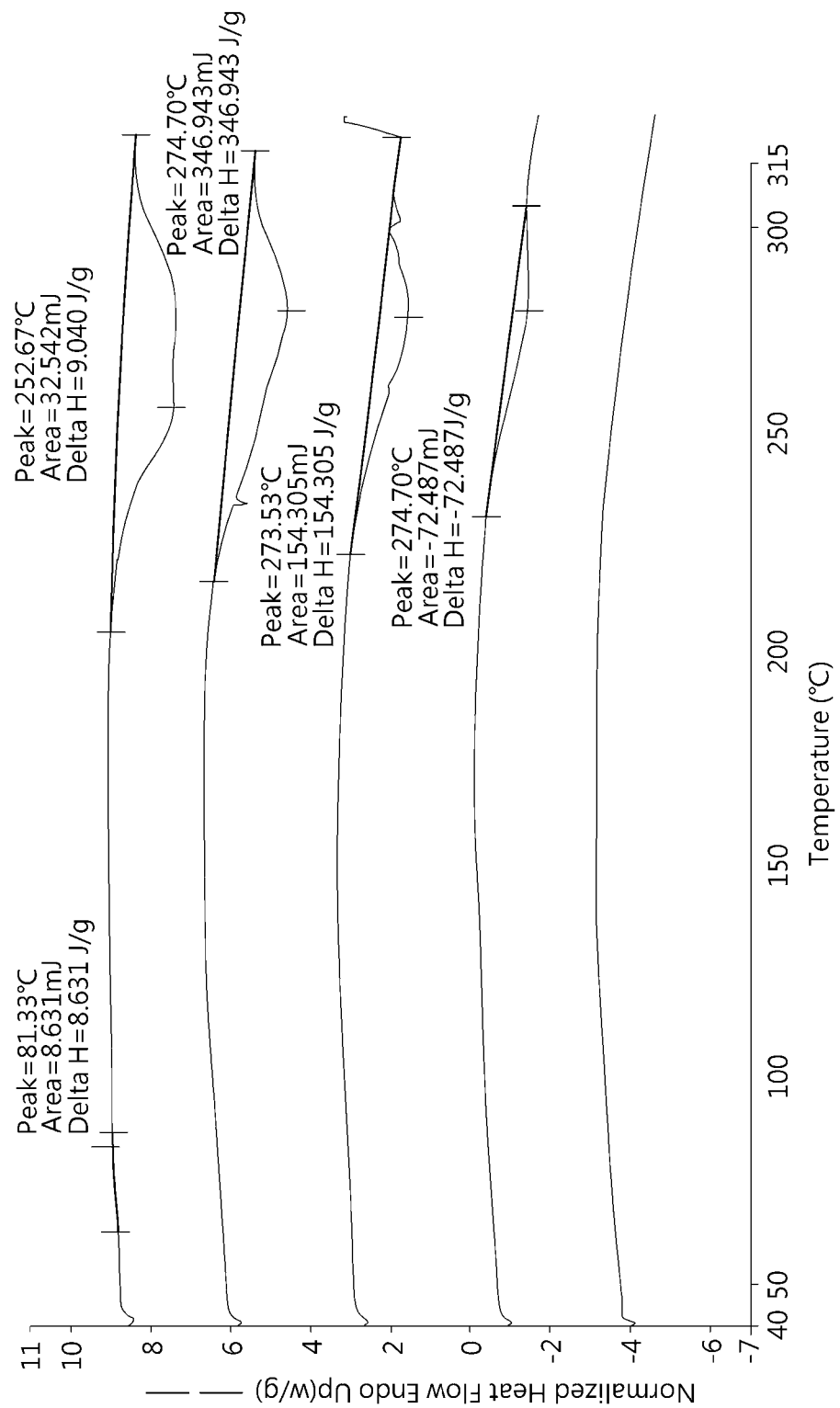
FIG. 6 shows temperature-changing tracing DSC figure
Figure 7:
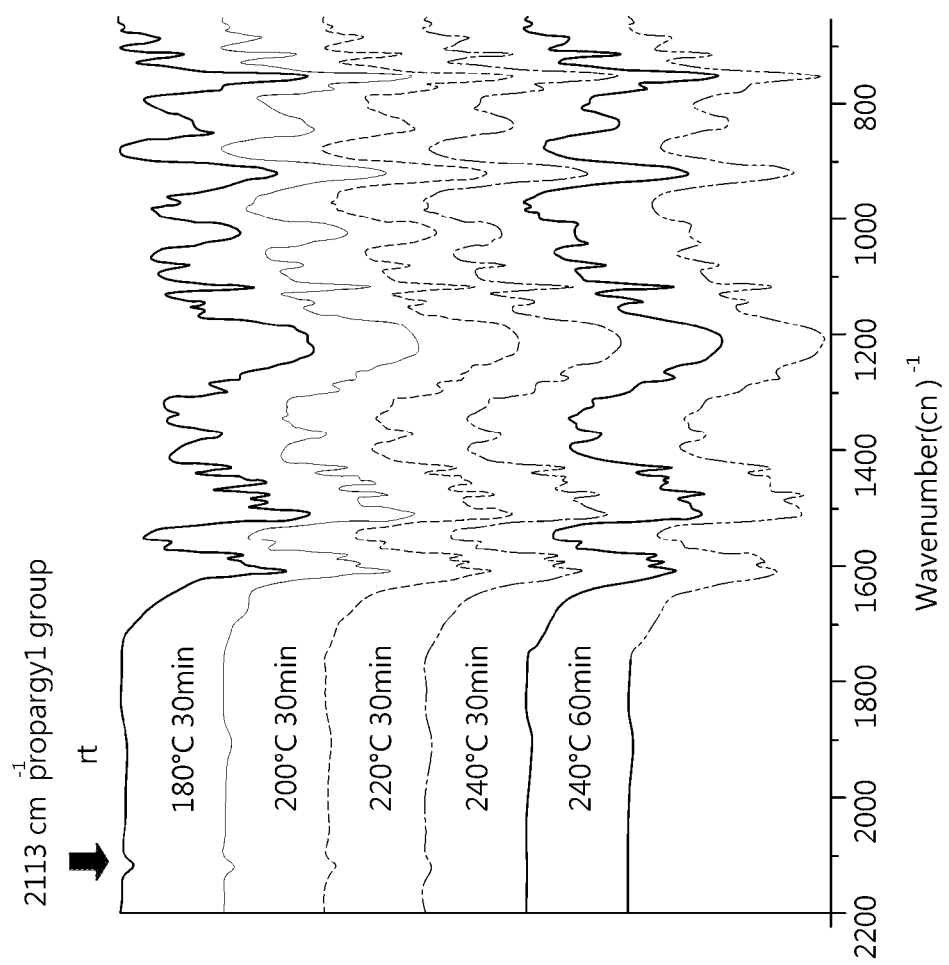
FIG. 7 shows Temperature-changing IR figure of monomer (B).

Blending monomer (B) and DDM-Bz with 1,4-Dioxane as solvent to form different phosphorus content ratios of 0.5, 0.75, 1.0, 1.25, 1.5 wt %. Then put them into cycling oven at 70° C. drying for 12 hours to remove most of solvent. Processing stage-heated to 180, 200, 220° C. for two hours individually, and baking at 240° C. for one hour (see FIG. 5 to FIG. 7).

Analysis of Thermal Property and Thermal Stability

Figure 8:
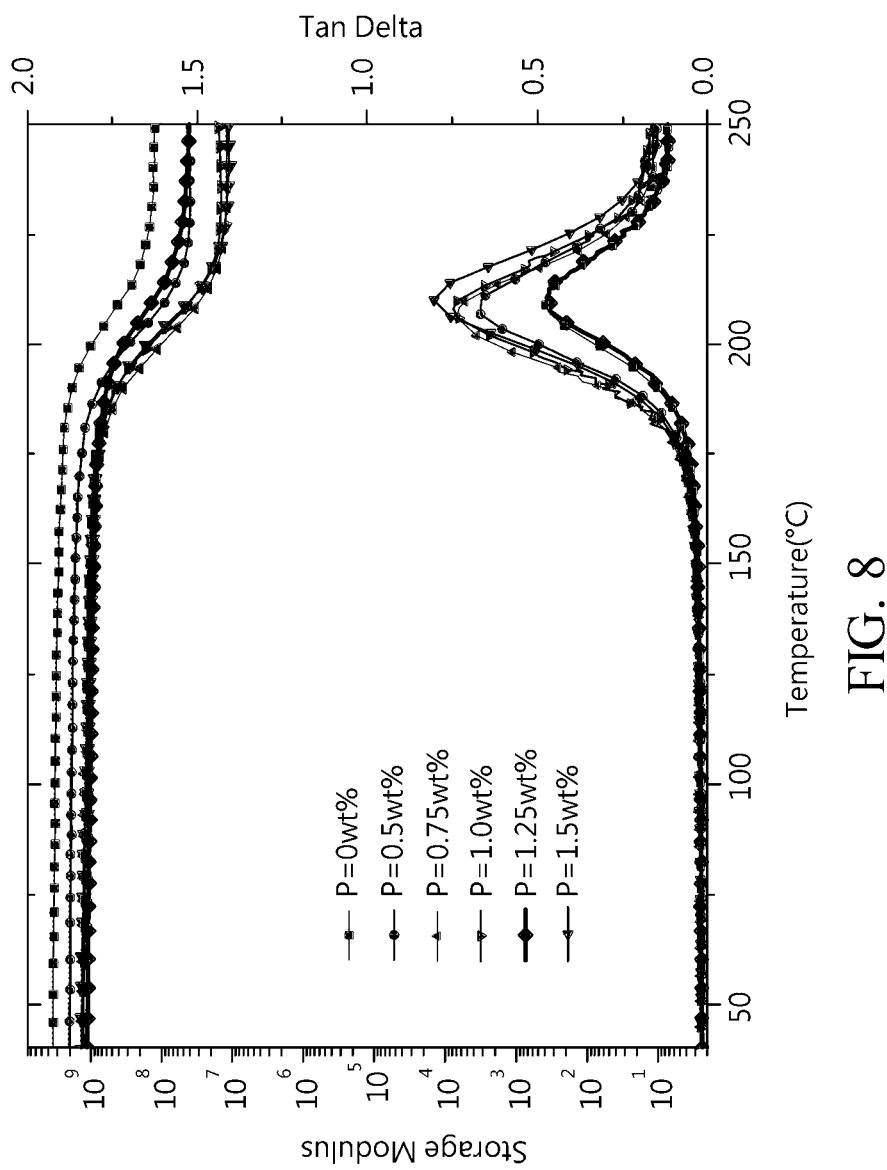
FIG. 8 shows dynamic mechanical analysis figure of polybenzoxazine cured article.
Figure 9:
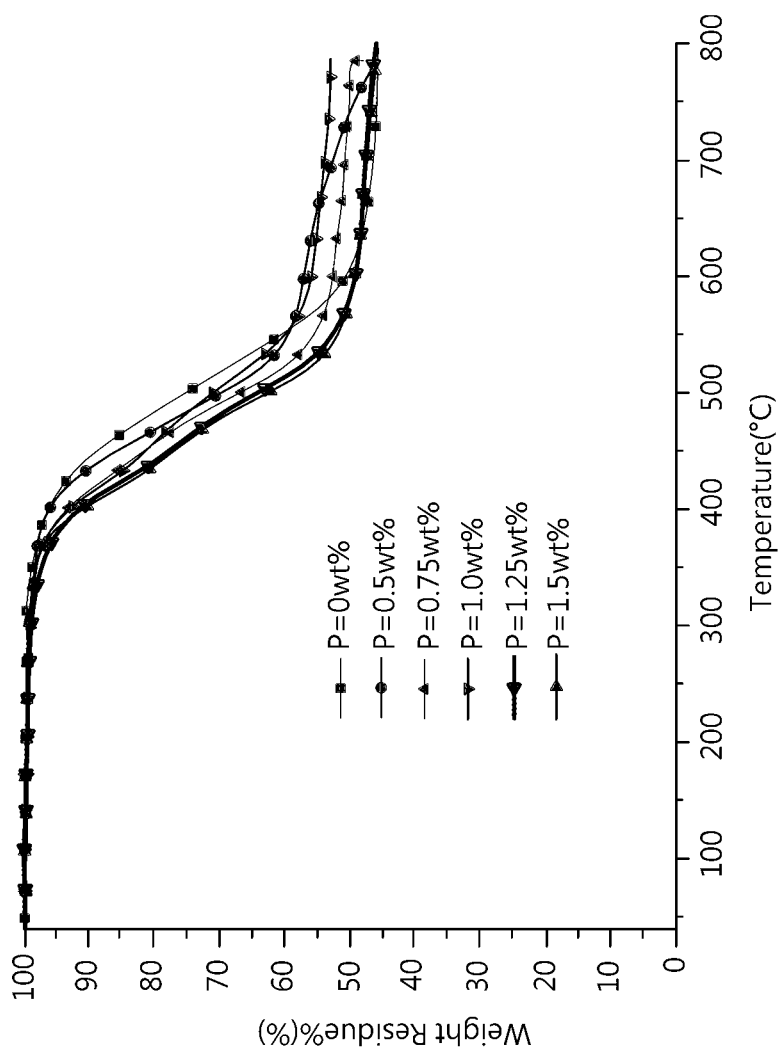
FIG. 9 shows thermal gravimetric analysis figure of polybenzoxazine cured article.

For cured polybenzoxazine, we process analysis of thermal property by dynamic mechanical analysis (DMA) (see FIG. 8) and thermal gravimetric analysis (TGA) (see FIG. 9), and it reveals excellent thermal property and thermal stability.

TABLE 1

Thermal property of of polybenzoxazine cured article

| Sample ID | E' (GPa) | Tanδ (° C.) | $T_d$ (° C.) | Char yield (wt %) |
|---|---|---|---|---|
| P = 0 wt % | 3.41 | 208 | 412 | 45 |
| P = 0.5 wt % | 1.98 | 209 | 410 | 45 |
| P = 0.75 wt % | 1.31 | 207 | 389 | 48 |
| P = 1.0 wt % | 1.27 | 208 | 388 | 53 |
| P = 1.25 wt % | 1.11 | 210 | 382 | 46 |
| P = 1.5 wt % | 1.34 | 210 | 385 | 46 |

(Thermal Stability columns: $T_d$ (° C.), Char yield (wt %))

The following claims are used to define the reasonable extent of protection of the present invention. It shall be known that various and obvious modifications by a person having ordinary knowledge in the art belong to the reasonable extent of protection of the present invention based on the disclosure of the present invention as well.

What claimed is:

1. A phosphorus based compound represented by formula (I):

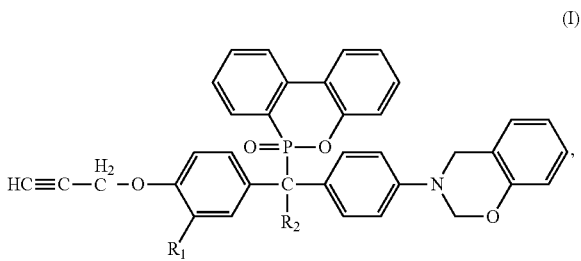

wherein

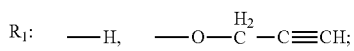

and

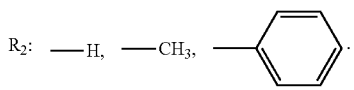

2. The compound according to claim 1, wherein when $R_1$ and $R_2$ both are hydrogen atoms in the compound of formula (I), the structural formula of the compound of formula (I) may be:

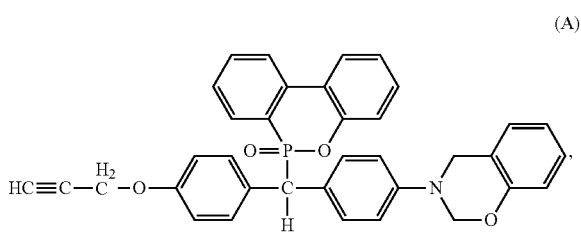 [SMILES: C#CCOc1ccc(C(c2ccc(N3COc4ccccc4C3)cc2)P2(=O)Oc3ccccc3-c3ccccc32)cc1]

when $R_1$ is hydrogen atom and $R_2$ is —$CH_3$ in the compound of the aforementioned formula (I), the structural formula of the compound of formula (I) may be:

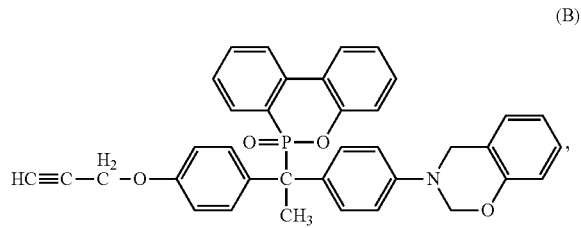 [SMILES: C#CCOc1ccc(C(C)(c2ccc(N3COc4ccccc4C3)cc2)P2(=O)Oc3ccccc3-c3ccccc32)cc1]

when $R_1$ is hydrogen atom and $R_2$ is

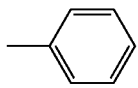

in the compound of the aforementioned formula (I), the structural formula of the compound of formula (I) may be:

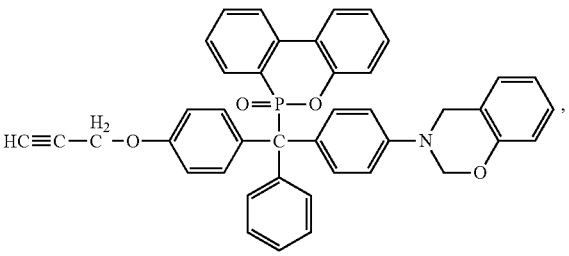
(C)

when $R_1$ is

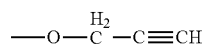

and $R_2$ is hydrogen atom in the compound of the aforementioned formula (I), the structural formula of the compound of formula (I) may be:

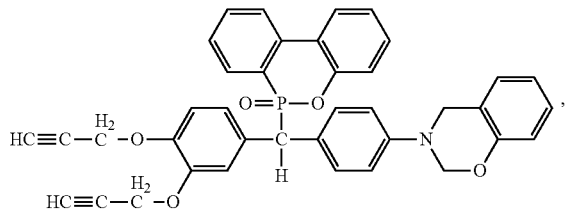
(D)

when $R_1$ is

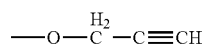

and $R_2$ is —$CH_3$ in the compound of the aforementioned formula (I), the structural formula of the compound of formula (I) may be:

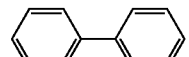
(E)

, and when $R_1$ is

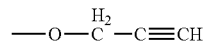

and $R_2$ is

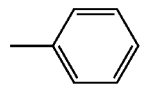

in the compound of the aforementioned formula (I), the structural formula of the compound of formula (I) may be:

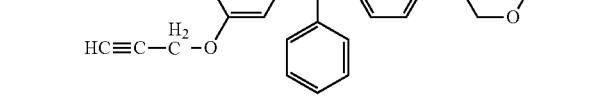
(F)

* * * * *